US011682415B2

(12) United States Patent
Cao et al.

(10) Patent No.: US 11,682,415 B2
(45) Date of Patent: Jun. 20, 2023

(54) AUTOMATIC VIDEO TAGGING

(71) Applicant: International Business Machines Corporation, Armonk, NY (US)

(72) Inventors: Li Cao, Beijing (CN); Jing Xu, Xi'an (CN); Ze Ming Zhao, Beijing (CN); Xue Ying Zhang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 17/206,891

(22) Filed: Mar. 19, 2021

(65) Prior Publication Data

US 2022/0301579 A1 Sep. 22, 2022

(51) Int. Cl.
*G10L 25/57* (2013.01)
*G10L 15/02* (2006.01)
*G10L 15/26* (2006.01)

(52) U.S. Cl.
CPC ............ *G10L 25/57* (2013.01); *G10L 15/02* (2013.01); *G10L 15/26* (2013.01)

(58) Field of Classification Search
CPC .......... G10L 25/57; G10L 15/26; G10L 15/02
See application file for complete search history.

(56) References Cited

U.S. PATENT DOCUMENTS

| | | | | | |
|---|---|---|---|---|---|
| 5,828,809 | A | * | 10/1998 | Chang | G06F 16/785 386/314 |
| 8,121,432 | B2 | * | 2/2012 | Dorai | G06F 16/7844 382/276 |
| 10,381,022 | B1 | * | 8/2019 | Chaudhuri | G10L 25/57 |
| 10,430,662 | B2 | | 10/2019 | Katz | |
| 10,566,009 | B1 | * | 2/2020 | Chaudhuri | G06F 16/683 |
| 10,573,313 | B2 | | 2/2020 | Mishra | |
| 11,342,003 | B1 | * | 5/2022 | Siagian | G11B 27/28 |
| 2003/0187642 | A1 | * | 10/2003 | Ponceleon | G10L 15/1822 704/252 |
| 2008/0193016 | A1 | * | 8/2008 | Lim | G06V 20/40 382/190 |
| 2015/0243276 | A1 | * | 8/2015 | Cooper | G11B 27/00 704/251 |
| 2018/0082152 | A1 | | 3/2018 | Katz | |
| 2018/0249193 | A1 | * | 8/2018 | Zhang | H04N 21/26603 |
| 2019/0139576 | A1 | * | 5/2019 | Delaney | G06V 20/46 |
| 2019/0172462 | A1 | | 6/2019 | Mishra | |
| 2019/0258671 | A1 | | 8/2019 | Bou | |
| 2019/0278978 | A1 | | 9/2019 | Park | |
| 2020/0065589 | A1 | * | 2/2020 | Fink | G06V 10/82 |

(Continued)

OTHER PUBLICATIONS

Ignat, Oana, et al. "Identifying visible actions in lifestyle vlogs." arXiv preprint arXiv:1906.04236 (2019). (Year: 2019).*

(Continued)

*Primary Examiner* — Brian L Albertalli
(74) *Attorney, Agent, or Firm* — Edward J. Wixted, III

(57) ABSTRACT

In an approach, a processor extracts an audio signal from a video clip. A processor converts the audio signal into a text sequence. A processor selects a first set of keywords from the text sequence, the first set of keywords corresponding to a first audio segment of the audio signal. A processor tags a target video segment of the video clip with the first set of keywords, the target video segment corresponding to the first audio segment.

17 Claims, 7 Drawing Sheets

(56) References Cited

U.S. PATENT DOCUMENTS

2020/0084519 A1  3/2020 Pappu
2020/0401621 A1* 12/2020 Bender ................. G06F 16/71

OTHER PUBLICATIONS

Gupta, Sonal, and Raymond Mooney. "Using closed captions as supervision for video activity recognition." Proceedings of the AAAI Conference on Artificial Intelligence. Vol. 24. No. 1. 2010. (Year: 2010).*

Nagrani, Arsha, et al. "Speech2action: Cross-modal supervision for action recognition." Proceedings of the IEEE/CVF conference on computer vision and pattern recognition. 2020. (Year: 2020).*

Asano, Yuki, et al. "Labelling unlabelled videos from scratch with multi-modal self-supervision." Advances in Neural Information Processing Systems 33 (2020): 4660-4671. (Year: 2020).*

Miech, Antoine, et al. "End-to-end learning of visual representations from uncurated instructional videos." Proceedings of the IEEE/CVF Conference on Computer Vision and Pattern Recognition. 2020. (Year: 2020).*

* cited by examiner

AUTOMATIC VIDEO TAGGING

BACKGROUND

The present invention relates generally to the field of video analysis techniques, and more particularly to approaches for automatic video tagging.

With the fast growth of video-capturing devices, dramatic increase of network bandwidth, and various forms of video-sharing on social networks, the number of available videos online and offline has rapidly grown in recent years. Video analysis has been used for a wide range of applications, including identifying objects within a video, action recognition, mental state analysis, emotional state analysis, and so on.

SUMMARY

According to one embodiment of the present invention, a computer-implemented method, computer program product, and computer system are provided. A processor converts the audio signal into a text sequence. A processor selects a first set of keywords from the text sequence, the first set of keywords corresponding to a first audio segment of the audio signal. A processor tags a target video segment of the video clip with the first set of keywords, the target video segment corresponding to the first audio segment.

DETAILED DESCRIPTION

Figure 1:
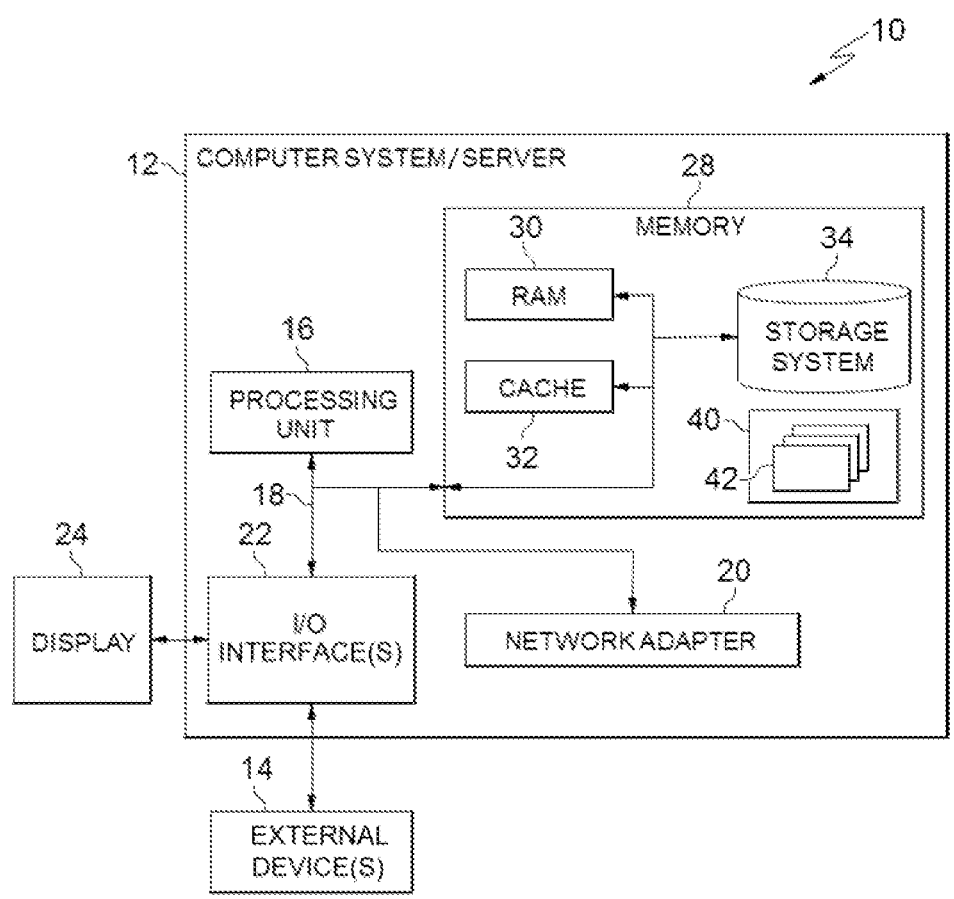
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
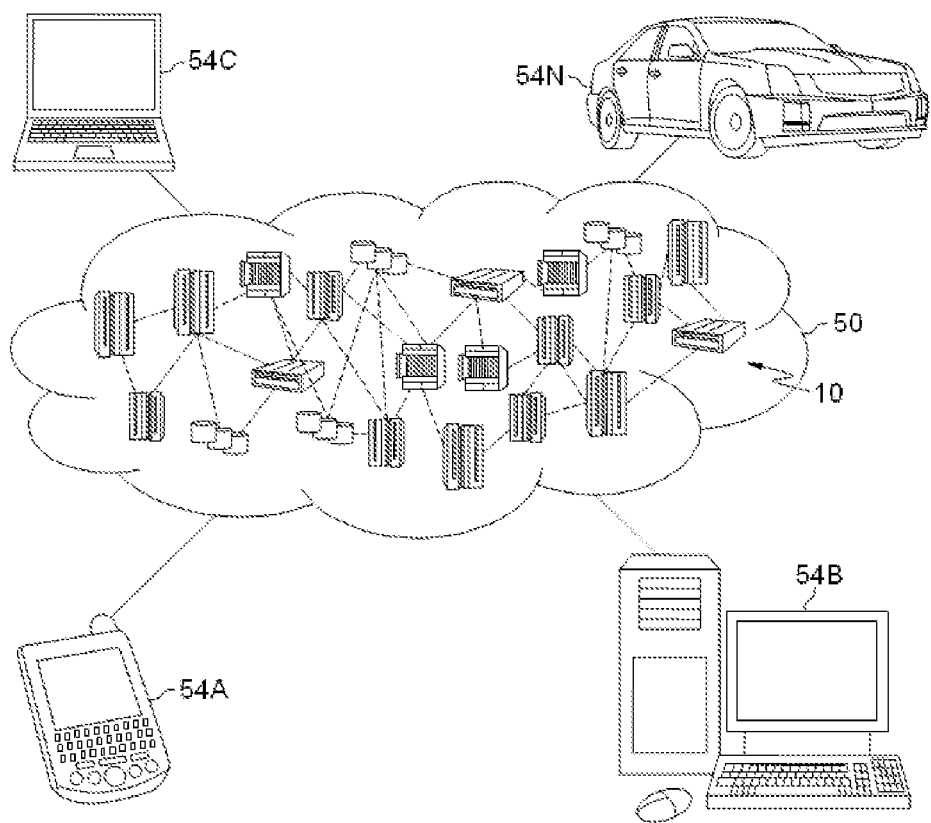
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
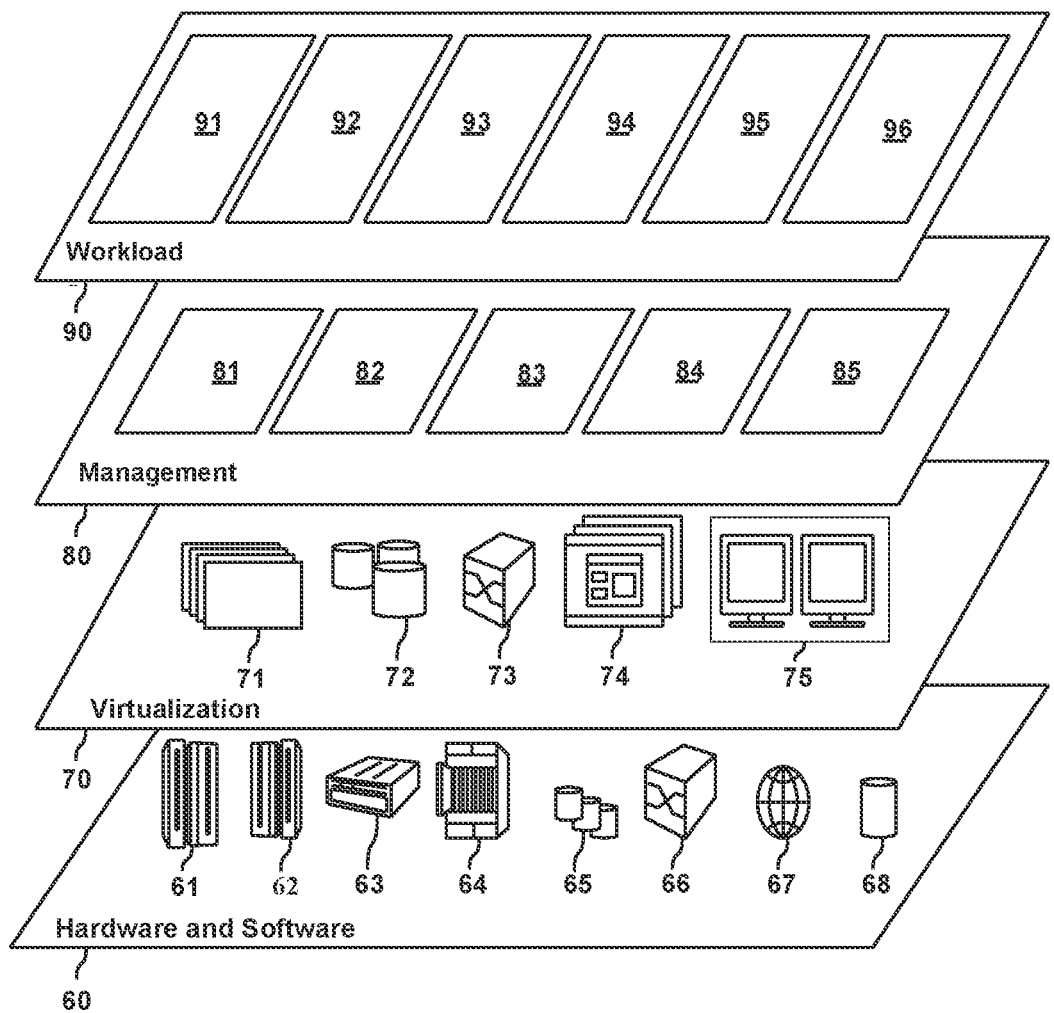
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automatic video tagging 96.

The functionalities of automatic video tagging 96 will be described in the following embodiment of the present disclosure.

Machine learning is a rapidly growing field and is more frequently being explored in various applications. In general terms, machine learning is to construct a system that can learn from training data. As used herein, a "machine learning network" is an artificial intelligence (AI) model, which may also be referred to as a "learning network", "learning model", "network model", or "model." These terms are used interchangeably hereinafter. A deep learning model is one example machine learning model, examples of which include a "neural network."

Performing machine learning usually involves the following three phrases: a training phase to train a machine learning model with training data; an evaluation/test phase to estimate how well the model has been trained by estimating model performance characteristics (e.g., classification errors for classifiers, etc.) using an evaluation dataset and/or a test dataset; and an application phrase to apply the real-world data to the trained machine learning model to get the results.

There exists a variety of machine learning models for different applications. Generally speaking, there are two groups of machine learning algorithms: unsupervised learning supervised learning. In supervised learning, the training data include input data and ground truth outputs for the input data, and the goal is to construct a function to predict an output for new input data. In unsupervised learning, the labels for the input data are not known and the goal is to find the hidden structure of the input data.

In most cases, supervised learning shows better performance than unsupervised learning. One of the important steps for supervised learning is to prepare a sufficient amount of training data consisting of input data and corresponding labels. When applying the supervised learning technologies to train models for video analysis, training data to be prepared may include video clips and tags in the videos. For examples, to train an action recognition model, training data includes video clips and tags indicating ground truth actions captured in the video clips. Embodiments of the present invention recognize that, in performing many video analysis tasks, there is a need to tag the scenes in the videos.

Figure 4:
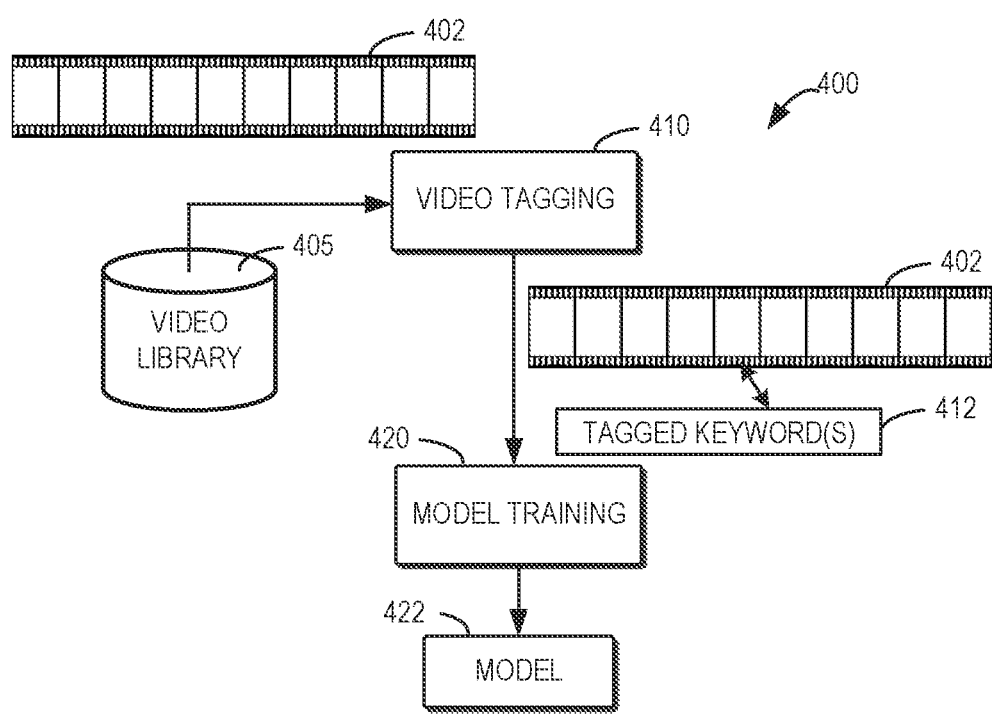
FIG. 4 depicts a block diagram of an environment according to an embodiment of the present invention.

FIG. 4 depicts a block diagram of an example environment 400 in which some embodiments of the present disclosure can be implemented. The environment 400 illustrates a process for training a model for video analysis, which includes a stage of video tagging 410 and a stage of model training 420.

The stage of video tagging 410 is to prepare training data for use in the stage of model training 420, in order to train a model 422 for video analysis based on supervised learning. A video library 405 includes a large amount of video clips collected from various sources such as video-sharing networks, video database, and the like. To support the supervised learning of the model 422, a video clip 402 in the video library 405 may be tagged with information indicating a scene captured in the video clips, such as an object, action, behavior, event, and/or the like. The tagged information may include a set of one or more keywords 412. The corresponding tagging process may be applied to a number of video clips.

If it is determined, from the set of keywords 412, that the video clip 402 is suitable for training the model 422, for example, if the set of keywords 412 indicates an action expected to be learned by the model 422, the video clip 402 or a part thereof as well as the set of keywords 412 may be selected as training data for use in the stage of model training 420.

To train a model with satisfactory performance, a large amount of training data consisting of input video and tagged information may need to be prepared. Traditionally, the preparation of the training data is performed manually.

Manual tagging for video is very time consuming with high cost of effort. To limit the time and cost, the manual tagging can generally record information indicating some typical classes of video clips. With such tagged information, it is impossible to provide a high diversity of training data to train a model with high performance.

Therefore, embodiments of the present invention recognize that there is a need for automatic video tagging.

In view of the above, according to embodiments of the present invention, there is proposed a solution for automatic video tagging. In this solution, instead of directly processing a video clip to determine information for tagging, an audio signal is extracted from the video clip and converted into a text sequence. Analysis is applied on the text sequence to extract one or more keywords for tagging a corresponding video segment of the video clip.

Generally, it is difficult to automatically understand the video content and describing the concerned scenes captured in the video clips. Through the solution proposed herein, by automatically analyzing audio content and textual content instead of the video clip, it is possible determine suitable information for tagging the video clip with high efficiency and lower cost of efforts.

Other advantages of the present disclosure will be described with reference to the example embodiments and the accompanying drawings below.

Figure 5:
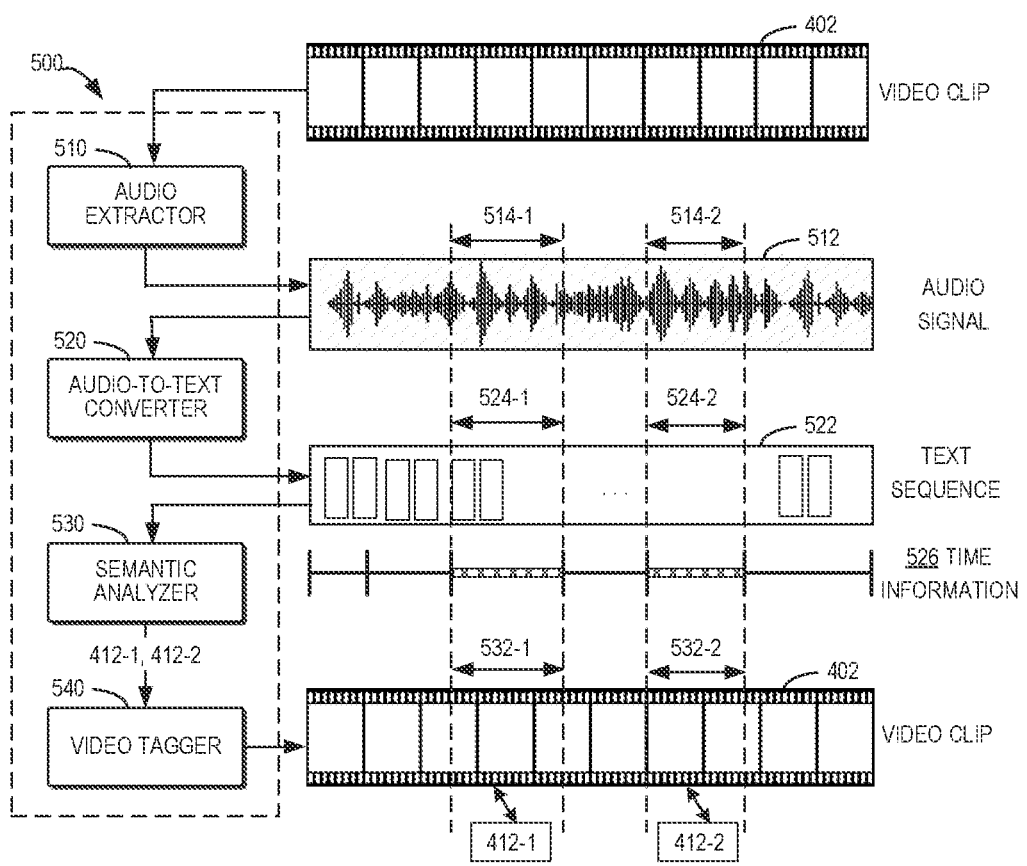
FIG. 5 depicts a block diagram of a video tagging system according an embodiment of the present invention.

Reference is now made to FIG. 5, which illustrates a block diagram of a video tagging system 500 according to some embodiments of the present disclosure. As illustrated, the video tagging system 500 comprises an audio extractor 510, an audio-to-text converter 520, a semantic analyzer 530, and a video tagger 540.

It would be appreciated that the video tagging system 500 may be implemented by one or more computing systems or devices having computing and storage capability. For example, the video tagging system 500 may be implemented by one or more computing platforms, servers, mainframes, general-purpose computing devices, and/or the like.

It would also be appreciated that the components of the video tagging system 500 shown in FIG. 5 may be implemented as one or more software engines, components, or the like, which are configured with logic for implementing the functionality attributed to the particular module. Each component may be implemented using one or more of such software engines, components or the like. The software engines, components, and the like are executed on one or more processors of one or more computing systems or devices and utilize or operate on data stored in one or more storage devices, memories, or the like, on one or more of the computing systems.

The video tagging system 500 is configured to automatically tag a video clip (e.g., the video clip 402) or a part thereof with one or more keywords 412 describing the video clip 402 or that part of the video clip 402.

As illustrated in FIG. 5, the audio extractor 510 is configured to extract an audio signal 512 from the video clip 402. In embodiments of the present disclosure, the video clip 402 comprises both of visual content and audio content. The visual content may include a sequence of frames. The audio content can be synchronized with the video content and may be separated from the video clip 402 for analysis. In some embodiments, to facilitate the video tagging, a number of video clips may be collected from various video sources that provide videos containing simultaneous audio data, such as movies, live broadcast, and/or the like.

In embodiments of the present disclosure, the audio signal 512, instead of the video clip 402, is processed and analyzed to determine tagged information for the video clip 402. As compared with the video clip 402, the information density of the audio signal 512 may be lower. Generally speaking, directly analyzing the video clip 402 may involve processing and analyzing a sequence of frames, which may be represented as matrices with pixel values representing the visual content. The cost for processing the matrices of pixel values may be higher. The amount of the matrices of pixel values may increase as the frame rate of the video clip 402 increases and the size of an individual frame increases. Moreover, there is no available automatic tool for analyzing the video clip 402 directly when preparing training data for training a model (e.g., the model 422). The training of the model 422 is in fact to produce such an automatic tool.

By contrast, the audio signal 512, which has a lower information density than the video clip 402, may be processed and analyzed in a more efficient way with lower computational resource consumption and higher accuracy. There are various algorithms and techniques available for processing and analyzing audio signals.

In embodiments of the present disclosure, to determine information for tagging the video clip 402, audio semantic analysis can be applied on the audio signal 512. Specifically, the audio signal 512 is converted by the audio-to-text converter 520 into a text sequence 522. The semantic analyzer 530 is configured to select a set of keywords from the text sequence 522 to tag one or more video segments of the video clip 402.

In some embodiments, the audio-to-text converter 520 may apply speech recognition (SR) techniques to automatically convert the audio signal 512 into the text sequence 522 which includes a plurality of words in any language. As such, the semantic analyzer 530 may explore the semantic meanings of the text sequence 522 so as to select one or more suitable words or phrases as a set of keywords to tag the video clip 402 or a part thereof. The set of selected keywords may describe a scene captured in the video clip 402 or a part thereof, such as a concerned object, action, behavior, event, and/or the like. The semantic analysis performed on the text sequence 522 will be described in detail below.

The video tagger 540 is configured to tag one or more target video segments of the video clip 402 with the set of keywords. A target video segment is corresponding to an audio segment of the audio signal 512 from which the set of keywords are determined. In some embodiments, the video tagger 540 may identify, based on time information, a target video segment to be tagged with the set of keywords 412 from the video clip 402.

In some embodiments, since the video clip 402 may be of any duration, it is expected to tag the video clip 402 in a finer-grained way, for example, by tagging one or more specific video segments of the video clip 402. In such case, the audio signal 512 may be divided into a plurality of audio segments, and/or the text sequence 522 may be divided into a plurality of text segments, each including one or more words and/or phrases. An audio segment or a text segment may be corresponding to a unit for semantic analysis.

In some examples, an audio segment or text segment may be corresponding to a sentence. As a result, separate sentences may be detected from the audio signal 512 or the text sequence 522. A sentence may include a plurality of text elements, which may include words. In the examples where the audio signal 512 is chunked into audio segments (for example, audio segments corresponding to sentences), the semantic analyzer 530 may identify corresponding text segments of the text sequence 522 based on the chunking results of the audio signal 512. It would be appreciated that the audio signal 512 and the text sequence 522 may be divided into other units than sentences. For example, an audio segment or a text segment may include a part of a sentence, two or more sentences, or the like.

Each text segment of the text sequence 522 may be corresponding to an audio segment of the audio signal 512. As used herein, a text segment corresponding to an audio segment means that the text segment is recognized from that audio segment. In some cases, there may be some segments of the audio signal 512 which include no speech, and those segments without speech may be omitted during the semantic analysis.

In some embodiments, the audio-to-text converter 520 may record time information 526 indicating temporal positions of the words of the text sequence 522 in the audio signal 512. The semantic analyzer 530 may use the time information 526 to determine the corresponding audio segment and thus the corresponding video segment of the set of selected keywords. The video clip 402 may be divided into a plurality of video segments each corresponding to one of the audio segments. As used herein, a video segment corresponding to an audio segment means that the audio segment is extracted from that video segment. As the audio signal 512 is synchronized with the video clip 402, the time information of the audio signal 512 is aligned with the time information of the video clip 402. According to the temporal alignments between the video clip 402, the audio signal 512, and the text sequence 522, a text segment of the text sequence 522 may be corresponding to a video segment of the video clip 402.

In the illustrated example of FIG. 5, the semantic analyzer 530 selects a set of keywords 412-1 from a text segment 524-1 of the text sequence 522 which is converted from an audio segment 514-1 of the audio signal 512, and a set of keywords 412-2 from a text segment 524-2 of the text sequence 522 which is converted from an audio segment 514-2 of the audio signal 512. The video tagger 540 may determine a target video segment 532-1 of the video clip 402 corresponding to the audio segment 514-2 (and thus corresponding to the text segment 524-1) and tag the target video segment 532-1 with the set of keywords 412-1. The video tagger 540 may also determine a target video segment 532-2 of the video clip 402 corresponding to the audio segment 514-2 (and thus corresponding to the text segment 524-2) and tag the target video segment 532-2 with the set of keywords 412-2.

For convenience of discussion, the set of keywords 412-1 and the set of keywords 412-2 may be collectively or individually referred to as the sets of keywords 412; the audio segments 514-1 and 514-2 may be collectively or individually referred to as audio segments 514; the text segments 524-1 and 514-2 may be collectively or individually referred to as text segments 524; and the target video segments 532-1 and 532-2 may be collectively or individually referred to as target video segments 532.

In some embodiments, the semantic analyzer 530 may analyze each of the text segments of the text sequence 522, to determine one or more keywords from the text segment for tagging the corresponding video segment of the video clip 402. In some embodiments, it is expected to identify and tag a specific video segment of the video clip 402 which presents an expected scene. One or more target keywords may be provided to the semantic analyzer 530 to determine whether any segment of the text sequence 522 includes one or more of such keywords.

In some embodiments, in the stage of video tagging for preparing training data for training a model for classifying an input video into one of a plurality of target video classes, the target keywords may include one or more words or phrases indicating one or more of the target video classes, and/or a target context related to one or more of the target video classes.

A specific example of the model for video analysis may include an action recognition model, which is constructed to determine whether one of a plurality of target actions is presented in an input video. To prepare training data for the action recognition model, the target keywords may include one or more words or phrases indicating one or more of the target actions, e.g., "play soccer," "shoot arrows," "swim," and the like. The target keywords may alternatively or additionally include one or more words or phrases indicating a target context related to one or more of the target actions. The words or phrases related to the context may be used to indicate specifically the scenes presented in the video clip 402. For example, the target keywords may include words or phrases indicating the physical environment related to the target actions, such as "rainy," "sunny," "cloudy," "outdoor," "indoor," and the like, words or phrases indicating the background information related to the target actions, such as "championship," "school sports day," and the like. Any other context that is expected to be used to describe the scenes related to the target actions or the target video classes may be included as the target keywords for use in the semantic analysis.

In some embodiments, the video tagging system 500 may be configured to identify and tag video segments in video clips that present one or more target actions and/or certain target contexts related to the actions. The target keywords indicating the target action(s) and/or the target context(s) may be preconfigured or determined, for example, by users. When performing the semantic analysis on the text sequence 522, the semantic analyzer 530 may be configured to analyze the text segments of the text sequence 522 to determine whether the text segments include one or more of the target keywords.

In some embodiments, the semantic analyzer 530 may compare the target keywords (for example, words and/or phrases) with the words or phrases included in the text segments of the text sequence 522. The semantic analyzer 530 may identify, from the text sequence 522, one or more text segments that include one or more words or phrases matching or synonymous with one or more target keywords. As used herein, matching or synonymous words or phrases indicate words of identical or similar meanings although their morphologies could be varied. Words of identical meaning include abbreviations (e.g., "PE" for "physical education"), alternative spellings (e.g., "football" for "soccer"), orthographical variations (e.g., "audio/visual input", "audiovisual input" and "audio-visual input"), verb variations for tense (e.g., "playing" for "play"), or the like. Abbreviations and verb variations can be identified by using a pre-compiled lexicon or matched on the fly by applying NLP techniques. Alternative spellings and orthographic variants can be recognized by lexical pattern processing.

In the example illustrated in FIG. 5, the semantic analyzer 530 may obtain target keywords such as "play soccer," "shoot arrows," and "swim." The semantic analyzer 530 may determine that the text segments 524-1 and 524-2 each include the target keyword "playing soccer." For example, the text segment 524-1 may include a sentence: "Look, there is a group of children playing soccer outdoor on the playground." The phrase "playing soccer" in the text segment 524-1 matches with one of the target keywords "play soccer." The text segment 524-2 may also be determined as including one or more of the target keywords.

For the one or more text segments including the target keyword(s), such as the text segments 524-1 and 524-2, the semantic analyzer 530 may determine a set of keywords 412 from each of the text segment(s). In some embodiments, the set of keywords 412 may include the target keyword(s) or the words or phrases matching or synonymous with the target keyword(s). In some embodiments, the set of keywords 412 may additionally include one or more further words or phrases that are useful for describing the scene captured in the corresponding video segment.

In some embodiments, the semantic analyzer 530 may perform semantic analysis on the text sequence 522, for example, on respective text segments of the text sequence 522. The semantic analyzer 530 may utilize natural language processing (NLP) techniques to analyze the text segments of the text sequence 522. For example, the semantic analyzer 530 may utilize a semantic analysis model which is constructed based on the NLP techniques. The semantic analysis model may be configured to analyze the semantic of a text segment 524 and select one or more words or phrases, which can be representative of the semantic, as the set of keywords.

In some embodiments, the semantic analyzer 530 may determine importance scores of a plurality of text elements included in the text segment 524. Each text element may include a word or a phrase that has a specific meaning. In some embodiments, the semantic analyzer 530 may eliminate connecting words, such as "and" or "or" and/or can remove articles, such as "the" and "an" and/or other common words, from the text segment 524.

In some embodiments, the semantic analyzer 530 may apply one or more importance scoring rules to determine respective importance scores for the plurality of text elements included in the text segment 524. The importance scoring rules may indicate how an importance score of a text element can be set based on one or more characteristics of the text element in the text segment (which may, for example, be a sentence). In some examples, example characteristics of a text element that may be used to measure its importance may include a part of speech of the text element (e.g., whether the text element is a noun, pronoun, verb, adjective, adverb, preposition, conjunction, or interjection), the use of the text element (e.g., which the text element is in a main clause or in a subordinate clause, or whether the text element has a qualifier or not), and the like. Accordingly, the importance scoring rules may define base importance scores for the eight parts of speech (e.g., noun, pronoun, verb, adjective, adverb, preposition, conjunction, and interjection) and different weights for different uses of a text element in a sentence.

As an example, for the phrase "playing soccer" in the example sentence "Look, there is a group of children playing soccer outdoor on the playground," its importance score may be determined based on a base importance score for a verb (e.g., because "playing soccer" is related to a verb) and a weight for a main clause (e.g., because "playing soccer" is used in the main clause in the sentence). For example, the corresponding importance score may be determined as a product of the base importance score and the weight. The importance scores for other text elements in the sentence may be determined in a similar way.

In some embodiments, if the video clip 402 and its tagged information are used to train a video analysis model, the importance scoring rules may be determined based on the configuration and the training of the video analysis model.

For example, if the video analysis model is configured as an action recognition model, the importance scoring rules may be set to allow the words or phrases related to "verbs" to have higher importance scores. If the training goal of the video analysis model is to train the model to have a high robustness level for analyzing videos captured in different weathers outdoor, the importance scoring rules may be set to allow the words or phrases related to "adjectives" to have higher importance scores. The importance scoring rules may be set in any other manners as long as the important words or phrases that can reflect the semantic of the sentence can be determined to have relatively high scores.

In some embodiments, the semantic analyzer 530 may select one or more of the text elements in the text segment 524 as the set of keywords 412 based on the determined importance scores. In some examples, the semantic analyzer 530 may sort the text elements in the text segment 524 based on the importance scores and select a predetermined number of text elements with highest importance scores. In some examples, the semantic analyzer 530 may select the text elements with their importance scores higher than a predetermined threshold.

Continuing with the example sentence "Look, there is a group of children playing soccer outdoor on the playground" included in the text segment 524-1, the semantic analyzer 530 may select three words and phrases "playing soccer," "outdoor," and "playground" as the set of keywords 412-1 because these words and phrases have higher importance scores than other words and phrases included in the text segment 524-1. For the text segment 524-2 which is determined to include one or more target keywords, the semantic analyzer 530 may select the set of keywords 412-2 in a similar way.

According to the embodiments of the present disclosure, the scenes in the video segments may be effectively and correctly described by selecting the keywords from the corresponding text segments. In addition to the keywords indicating the target video classes (such as the target actions), one or more other keywords indicating the contexts related to the scenes may also be collected and tagged to corresponding video segments. Further, the video segments to be tagged may be controlled by configuring the target keywords. As such, it is possible to collected video segments capturing different expected scenes.

In some example embodiments, the tagged information for a target video segment may be expanded based on one or more adjacent video segments. As mentioned above, the text sequence 522 may be divided into a plurality of text segments, for example, in units of sentence. If a text segment including one or more target keywords, for example, the text segment 524-1 or 524-2, is found, the semantic analyzer 530 of the video tagging system 500 may determine one or more text segments adjacent to the text segment 524 in the text sequence 522. An adjacent text segment is corresponding to an audio segment adjacent to the audio segment 514 which is corresponding to the text segment 524. The semantic analyzer 530 may select one or more sets of keywords from the one or more adjacent text segments for each text segment 524.

Figure 6A:
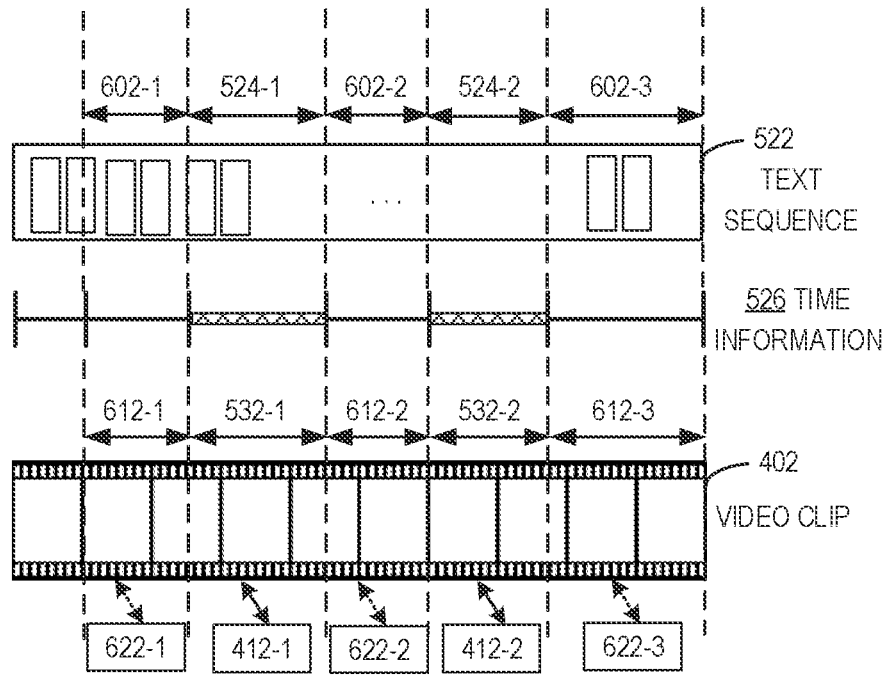
FIGS. 6A and 6B depict examples of context-based video tagging according to an embodiment of the present invention.

For example, as illustrated in FIG. 6A, for the text segment 524-1 of the text sequence 522 which includes one or more target keywords, the semantic analyzer 530 may select a set for keywords 622-1 from a text segment 602-1 located before the text segment 524-1 in the text sequence 522, and a set of keywords 622-2 from a text segment 602-2 located after the text segment 524-2 in the text sequence 522. The text segment 602-1 may be corresponding to an audio segment of the audio signal 512 before the audio segment 514-1 corresponding to the text segment 524-1. Similarly, the text segment 602-2 may be corresponding to an audio segment of the audio signal 512 before the audio segment 514-2 corresponding to the text segment 524-2. For the text segment 524-2, the semantic analyzer 530 may also select the set of keywords 622-2 from the text segment 602-2 located before the text segment 524-2 and select a set of keyword 622-3 from a text segment 602-3 located after the text segment 524-2 in the text sequence 522. The selection of the keywords from a text segment may be similar to that described above, which is not detailed again here.

The set of keywords 622-1 may be considered as keywords that can be used to tag a video segment 612-1 of the video clip 402, which is corresponding to the text segment 602-1 according to the time information 526. Similarly, the set of keywords 622-2 may be considered as keywords that can be used to tag a video segment 612-2 of the video clip 402, which is corresponding to the text segment 602-2; and the set of keywords 622-3 may be considered as keywords that can be used to tag a video segment 612-3 of the video clip 402, which is corresponding to the text segment 602-3.

In some example embodiments, the semantic analyzer 530 may determine whether a set of keywords selected from each of the adjacent text segments comprise one or more keywords matching with the set of keywords selected from the text segment 524. As defined above, matching keywords indicate words of identical or similar meanings although their morphologies could be varied, including abbreviations, alternative spellings, orthographical variations, verb variations for tense, or the like.

If it is determined that one or more sets of keywords selected from the adjacent text segments include one or more keywords matching with the set of keywords 412 selected from the text segment 524, the semantic analyzer 530 may merge the one or more sets of keywords selected from the adjacent text segments with the set of keywords 412 selected from the text segment 524.

For example, the text segment 602-1 before the text segment 524-1 includes a sentence of "It's a brilliantly sunny morning and many children have their PE classes outdoor." The semantic analyzer 530 may select a set of keywords 622-1 including "sunny," "PE classes," and "outdoor" for the text segment 602-1. The semantic analyzer 530 determines that the set of keywords 622-1 comprise a common keyword "outdoor" with the set of keywords 412-1 selected from the text segment 524-1. Thus, the set of keywords 622-1 and the set of keywords 412-1 may be merged together to generate a merged set of keywords including "sunny," "PE classes," "outdoor," "playing soccer," "outdoor," and "playground."

Figure 6B:
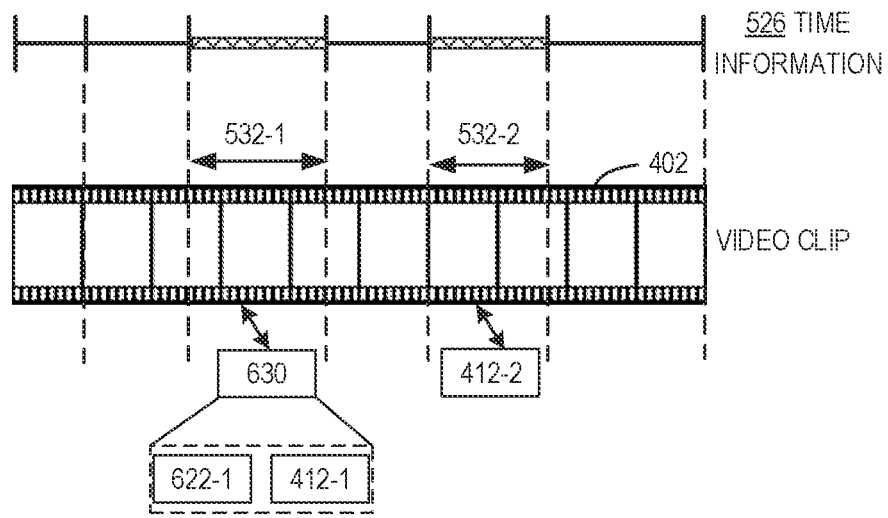

The merged set of keywords may be provided to the video tagger 540 to tag the target video segment of the video clip 402. As illustrated in FIG. 6B, the video tagger 540 may tag the target video segment 532-1 with a merged set of keywords 630 which are merged from the set of keywords 622-1 and the set of keywords 412-1. By merging more information extracted from the text segments (and thus from the corresponding video segments) adjacent to the target video segment, more context-related information may be obtained to tag the target video segment. As such, the scenes captured in the target video segment may be elaborated with more textual information.

In some embodiments, if the set of keywords 412 determined for a text segment 524 has no keyword matching with its adjacent text segment(s), the video tagger 540 may tag the corresponding target video segment 532 with the set of keywords 412. As illustrated in FIG. 6B, the target video segment 532-1 is tagged with the set of keywords 412-2 which are selected from the corresponding text segment 524-2.

In some embodiments, the video tagger 540 may tag one or more video segments with the determined set(s) of keywords even if one or more text segments corresponding to the video segments are determined to include no target keywords. For example, the video tagger 540 may tag the video segment 612-1 with the set of keywords 622-1, tag the video segment 612-2 with the set of keywords 622-2, and tag the video segment 612-2 with the set of keywords 622-3, as illustrated in FIG. 6A. Those video segments and their tagged sets of keywords may be used in other applications which may need to collect videos related to one or more other target keywords.

In some embodiments, the video tagger 540 may expand a target video segment 532 of the video clip 402 and tag the expanded target video segment with the determined keywords. For example, the expanded target video segment may be of a duration longer than a duration of a sentence.

In some embodiments, the set of keywords 412 or the merged set of keywords 630 determined for a target video segment 532 of the video clip 402 may be presented to a user for further verification. The target video segment 532 or the whole video clip 402 may also be presented to the user. The user may simply confirm whether the determined keywords are correct or whether any keyword may be updated, deleted, replaced, or added by viewing the target video segment. The time consumption and cost of efforts by such verification may be limited.

Although the processing of one video clip is illustrated above, the video tagging system 500 may operate to automatically tag any number of input video clips. The video clip tagged with the keyword(s) may be accessed or selected to train a model that is configured for video analysis, for example, the model 422 in the environment 400. In some embodiments, one or more keywords tagged to the video segment may be used for selecting the expected training data. For example, in order to increase the scenario diversity and balance the distribution of different video classes for training a model, it may be expected to collect videos presenting different target actions occurred in different contexts in the training data. The tagged keywords indicating the contexts may be helpful for selecting the expected video segments for model training.

In some embodiments where the video clip tagged with the keyword(s) at least indicating a target action, the video clip and the tagged keyword(s) indicating the target action may be selected to train an action recognition model. The video clip and the tagged keyword(s) may also be used to train other video analysis models.

It would be appreciated that in addition to being used for training the models, the video clip and the tagged keyword(s) may be used in any other video analysis applications which need information about what is captured in the video clip.

Figure 7:
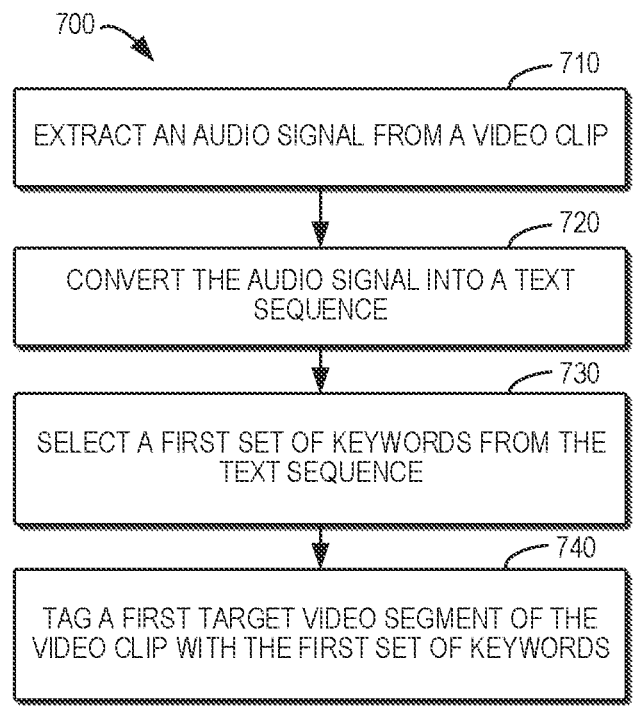
FIG. 7 depicts a flowchart according to an embodiment of the present invention.

FIG. 7 shows a flowchart of an example method 700 according to some embodiments of the present invention. The method 700 can be implemented at the video tagging system 500 as shown in FIG. 5. For the purpose of discussion, the method 700 will be described from the perspective of the video tagging system 500.

At block 710, the video tagging system 500 extracts an audio signal from a video clip. At block 720, the video tagging system 500 converts the audio signal into a text sequence. The text sequence may comprise a plurality of text elements, and each text element may include a word or a phrase.

At block 730, the video tagging system 500 selects a first set of keywords from the text sequence. The first set of keywords is corresponding to a first audio segment of the audio signal. At block 740, the video tagging system 500 tags a target video segment of the video clip with the first set of keywords. The target video segment is corresponding to the first audio segment.

In some embodiments, extracting the first set of keywords from the text sequence comprises: dividing the text sequence into a plurality of text segments, the plurality of text segments corresponding to a plurality of audio segments of the audio signal, and a text segment of the plurality of text segments comprising at least one of a word and a phrase; selecting, from the plurality of text segments, a text segment comprising at least one target keyword; and determining the first set of keywords from the text segment, the first set of keywords at least comprising the at least one target keyword.

In some embodiments, the target video segment and the first set of keywords are selected for training an action recognition model. In some embodiments, the at least one target keyword comprises at least one of the following: at least one word or phrase indicating a target action to be recognized by the action recognition model, and at least one word or phrase indicating a target context related to the target action.

In some embodiments, determining the first set of keywords from the text segment comprises: in accordance with a determination that the text segment comprises a plurality of text elements, determining a plurality of importance scores of the plurality of words, a text element of the plurality of text elements comprising a word or a phrase; and selecting the first set of keywords from the plurality of words based on the plurality of importance scores.

In some embodiments, the first set of keywords further comprises at least one further word or phrase selected from the text segment.

In some embodiments, tagging the target video segment comprises: selecting a second set of keywords from the text sequence, the second set of keywords being corresponding to a second audio segment of the audio signal, the second audio segment being adjacent to the first audio segment; determining whether the second set of keywords comprises at least one keyword matching with the first set of keywords; in accordance with a determination that the second set of keywords comprises at least one keyword matching with the first set of keywords, merging the second set of keywords with the first set of keywords, to obtain a merged set of keywords; and tagging the target video segment with the merged set of keywords.

In some embodiments, extracting the first set of keywords from the text sequence comprises: extracting the first set of keywords by performing semantic analysis on the text sequence using a semantic analysis model.

It should be noted that the processing of automatic video tagging according to embodiments of this disclosure could be implemented by computer system/server 12 of FIG. 1. In some embodiments, the video tagging system 500 or one or more components of the video tagging system 500 could be implemented by computer system/server 12 of FIG. 1.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   extracting, by one or more processors, a first audio signal from a target video segment of a video clip;
   converting, by one or more processors, the first audio signal into a first text sequence;
   selecting, by one or more processors, a first set of keywords from the first text sequence, the first set of keywords corresponding to the target video segment;
   selecting, by one or more processors, a second set of keywords from a second text sequence, the second text sequence corresponding to a second audio signal, the second audio signal adjacent to the first audio signal;
   determining, by one or more processors, that the first set of keywords and the second set of keywords include a matching keyword;
   creating, by one or more processors, a merged set of keywords by merging the first set of keywords and the second set of keywords; and
   tagging, by one or more processors, the target video segment with the merged set of keywords.

2. The computer-implemented method of claim 1, wherein selecting the first set of keywords from the first text sequence comprises:
   dividing, by one or more processors, the first text sequence into a plurality of text segments, the plurality of text segments corresponding to a plurality of audio segments of the audio signal, and a text segment of the plurality of text segments comprising a sentence;
   selecting, by one or more processors, a text segment comprising at least one target keyword from the plurality of text segments; and
   determining, by one or more processors, the first set of keywords from the text segment, the first set of keywords comprising the at least one target keyword.

3. The computer-implemented method of claim 2, wherein:
   the target video segment and the first set of keywords are selected for training an action recognition model; and
   the at least one target keyword comprises a selection from the group consisting of: a word indicating a target action to be recognized by the action recognition model, a phrase indicating the target action to be recognized by the action recognition model, a word indicating a target context related to the target action, and a phrase indicating a target context related to the target action.

4. The computer-implemented method of claim 2, wherein determining the first set of keywords from the text segment comprises:
   responsive to determining that the text segment comprises a plurality of text elements, determining, by one or more processors, (i) a plurality of importance scores of the plurality of text elements and (ii) a text element of the plurality of text elements comprising a selection from the group consisting of: a word and a phrase; and selecting, by one or more processors, the first set of keywords from the plurality of words based on the plurality of importance scores.

5. The computer-implemented method of claim 2, wherein the first set of keywords further comprises at least one additional selection from the group consisting of: a word selected from the text segment and a phrase selected from the text segment.

6. The computer-implemented method of claim 1, wherein selecting the first set of keywords from the first text sequence comprises:
selecting, by one or more processors, the first set of keywords by performing semantic analysis on the first text sequence using a semantic analysis model.

7. A computer program product comprising:
one or more computer readable storage media, and program instructions collectively stored on the one or more computer readable storage media, the program instructions comprising:
program instructions to extract a first audio signal from a target video segment of a video clip;
program instructions to convert the first audio signal into a first text sequence;
program instructions to select a first set of keywords from the first text sequence, the first set of keywords corresponding to the target video segment;
program instructions to select a second set of keywords from a second text sequence, the second text sequence corresponding to a second audio signal, the second audio signal adjacent to the first audio signal;
program instructions to determine that the first set of keywords and the second set of keywords include a matching keyword;
program instructions to create a merged set of keywords by merging the first set of keywords and the second set of keywords; and
program instructions to tag the target video segment with the merged set of keywords.

8. The computer program product of claim 7, wherein program instructions to select the first set of keywords from the first text sequence comprise:
program instructions to divide the first text sequence into a plurality of text segments, the plurality of text segments corresponding to a plurality of audio segments of the audio signal, and a text segment of the plurality of text segments comprising a sentence;
program instructions to select a text segment comprising at least one target keyword from the plurality of text segments; and
program instructions to determine the first set of keywords from the text segment, the first set of keywords comprising the at least one target keyword.

9. The computer program product of claim 8, wherein:
the target video segment and the first set of keywords are selected for training an action recognition model; and
the at least one target keyword comprises a selection from the group consisting of: a word indicating a target action to be recognized by the action recognition model, a phrase indicating the target action to be recognized by the action recognition model, a word indicating a target context related to the target action, and a phrase indicating a target context related to the target action.

10. The computer program product of claim 8, wherein program instructions to determining the first set of keywords from the text segment comprise:

program instructions to, responsive to determining that the text segment comprises a plurality of text elements, determine (i) a plurality of importance scores of the plurality of text elements, and (ii) a text element of the plurality of text elements comprising a selection from the group consisting of: a word and a phrase; and
program instructions to select the first set of keywords from the plurality of words based on the plurality of importance scores.

11. The computer program product of claim 8, wherein the first set of keywords further comprises at least one additional selection from the group consisting of: a word selected from the text segment and a phrase selected from the text segment.

12. The computer program product of claim 7, wherein program instructions to select the first set of keywords from the first text sequence comprise:
program instructions to select the first set of keywords by performing semantic analysis on the first text sequence using a semantic analysis model.

13. A computer system comprising:
one or more computer processors, one or more computer readable storage media, and program instructions collectively stored on the one or more computer readable storage media for execution by at least one of the one or more computer processors, the program instructions comprising:
program instructions to extract a first audio signal from a target video segment of a video clip;
program instructions to convert the first audio signal into a first text sequence;
program instructions to select a first set of keywords from the first text sequence, the first set of keywords corresponding to the target video segment;
program instructions to select a second set of keywords from a second text sequence, the second text sequence corresponding to a second audio signal, the second audio signal adjacent to the first audio signal;
program instructions to determine that the first set of keywords and the second set of keywords include a matching keyword;
program instructions to create a merged set of keywords by merging the first set of keywords and the second set of keywords; and
program instructions to tag the target video segment with the merged set of keywords.

14. The computer system of claim 13, wherein program instructions to select the first set of keywords from the first text sequence comprise:
program instructions to divide the first text sequence into a plurality of text segments, the plurality of text segments corresponding to a plurality of audio segments of the audio signal, and a text segment of the plurality of text segments comprising a sentence;
program instructions to select a text segment comprising at least one target keyword from the plurality of text segments; and
program instructions to determine the first set of keywords from the text segment, the first set of keywords comprising the at least one target keyword.

15. The computer system of claim 14, wherein:
the target video segment and the first set of keywords are selected for training an action recognition model; and
the at least one target keyword comprises a selection from the group consisting of: a word indicating a target action to be recognized by the action recognition model, a phrase indicating the target action to be recognized by the action recognition model, a word indicating a target context related to the target action, and a phrase indicating a target context related to the target action.

16. The computer system of claim 14, wherein program instructions to determining the first set of keywords from the text segment comprise:

program instructions to, responsive to determining that the text segment comprises a plurality of text elements, determine (i) a plurality of importance scores of the plurality of text elements, and (ii) a text element of the plurality of text elements comprising a selection from the group consisting of: a word and a phrase; and program instructions to select the first set of keywords from the plurality of words based on the plurality of importance scores.

17. The computer system of claim 14, wherein the first set of keywords further comprises at least one additional selection from the group consisting of: a word selected from the text segment and a phrase selected from the text segment.

* * * * *